(12) United States Patent
Wiyninger et al.

(10) Patent No.: US 11,000,863 B2
(45) Date of Patent: May 11, 2021

(54) PUSH VALVE ASSEMBLY AND METHOD

(71) Applicant: Pentair Flow Technologies, LLC, Delavan, WI (US)

(72) Inventors: Bradley Keith Wiyninger, Delano, MN (US); Jeff Hermes, Shoreview, MN (US); Erich Grutzner, Mounds View, MN (US); Eli McElwain, Andover, MN (US)

(73) Assignee: Pentair Flow Technologies, LLC, Delavan, WI (US)

( * ) Notice: Subject to any disclaimer, the term of this patent is extended or adjusted under 35 U.S.C. 154(b) by 16 days.

(21) Appl. No.: 16/365,294

(22) Filed: Mar. 26, 2019

(65) Prior Publication Data

US 2020/0306773 A1  Oct. 1, 2020

(51) Int. Cl.
| | |
|---|---|
| *B05B 1/30* | (2006.01) |
| *F16K 1/12* | (2006.01) |
| *F16K 31/44* | (2006.01) |
| *B08B 9/093* | (2006.01) |

(52) U.S. Cl.
CPC .............. *B05B 1/3013* (2013.01); *F16K 1/12* (2013.01); *B08B 9/093* (2013.01); *F16K 31/44* (2013.01); *Y10T 137/86517* (2015.04); *Y10T 137/87* (2015.04); *Y10T 137/88062* (2015.04)

(58) Field of Classification Search
CPC ......... Y10T 137/2668; Y10T 137/2688; Y10T 137/2693; Y10T 137/2652; Y10T 137/2647; Y10T 137/7835; Y10T 137/86517; Y10T 137/86799; Y10T 137/86984; Y10T 137/86992; Y10T 137/87; Y10T 137/86887; Y10T 137/87877; F16K 11/048; B08B 9/08-46; B05B 1/3013; B05B 1/1618; B05B 1/3046; B05B 15/555
USPC ............. 137/119.01, 119.06, 119.08, 115.28, 137/118.02, 509, 614.16–614.21, 625.13, 137/625.38, 630.15, 630.16, 630.17, 137/625.49, 883
See application file for complete search history.

(56) References Cited

U.S. PATENT DOCUMENTS

| | | | | |
|---|---|---|---|---|
| 1,502,483 | A * | 7/1924 | O'Flaherty | ......... F16K 11/0565 |
| | | | | 137/625.13 |
| 1,732,097 | A * | 10/1929 | Lemetais | .............. F16K 11/163 |
| | | | | 137/630.17 |
| 1,995,480 | A * | 3/1935 | Murphy | ................. F02M 37/46 |
| | | | | 137/115.27 |

(Continued)

OTHER PUBLICATIONS

Pentair Hypro ProClean Tank and Container Wash / Rinsing Nozzles, PC1/2F-36075-PV, PC1/2F-36075, PV1/2F1/2M-MA, and PC1/2F-235120, https://www.pentair.com/en/products/accessories/agricultural-spray-accessories/pc12f36075pv-pc12f36075-pv12f12mma-pc12f235120.html (last accessed Jul. 2, 2019).

(Continued)

*Primary Examiner* — William M McCalister
(74) *Attorney, Agent, or Firm* — Husch Blackwell LLP (57) ABSTRACT

Embodiments of the invention provide a push valve assembly. The push valve assembly includes a valve piston that is movable within a valve body between a fully opened position and a fully closed position, passing through an intermediate rinsing position, to selectively provide pressurized fluid through flow paths defined by the position of the valve piston.

13 Claims, 5 Drawing Sheets

(56) References Cited

U.S. PATENT DOCUMENTS

| | | | | |
|---|---|---|---|---|
| 2,178,223 | A * | 10/1939 | Czarnecki | G05D 16/10 137/115.28 |
| 2,226,810 | A * | 12/1940 | Ensign | G05D 16/18 62/50.2 |
| 2,277,491 | A * | 3/1942 | Huber | G05D 16/0619 137/115.28 |
| 2,520,069 | A * | 8/1950 | Simpson | 137/630.16 |
| 2,584,877 | A * | 2/1952 | Hoffman | F01M 5/007 123/196 AB |
| 2,707,966 | A * | 5/1955 | Taplin | G05D 16/0663 137/116.5 |
| 3,056,257 | A * | 10/1962 | Brunkhardt | F02K 9/95 137/119.08 |
| 3,085,588 | A * | 4/1963 | Oliphant | F16K 1/46 137/119.08 |
| 3,092,120 | A | 6/1963 | Hilger et al. | |
| 3,232,307 | A * | 2/1966 | Bucknell | F16K 19/00 137/119.08 |
| 3,446,233 | A * | 5/1969 | Wilhelm | F04D 15/0011 137/119.07 |
| 3,505,928 | A * | 4/1970 | Whitehouse | B25B 23/145 91/1 |
| 3,559,670 | A * | 2/1971 | Yedidiah | G01F 7/00 137/110 |
| 3,675,825 | A | 7/1972 | Morane | |
| 3,685,533 | A * | 8/1972 | Krechel | F16K 17/10 137/115.05 |
| 3,706,325 | A * | 12/1972 | Pauliukonis | F16K 11/048 137/625.66 |
| 3,807,448 | A * | 4/1974 | Hadden | F16K 31/385 137/596.14 |
| 3,866,629 | A * | 2/1975 | Nicklas | F16K 19/00 137/885 |
| 3,871,422 | A * | 3/1975 | Elson | F16K 15/20 137/231 |
| 3,880,206 | A | 4/1975 | Johnston | |
| 4,186,759 | A | 2/1980 | Stevenson et al. | |
| 4,243,064 | A * | 1/1981 | Nolte | F16K 15/06 137/115.04 |
| 4,313,460 | A * | 2/1982 | Johnson | F16K 31/365 137/489 |
| 4,385,640 | A * | 5/1983 | Iverson | B05B 9/0403 137/115.05 |
| 4,501,623 | A | 2/1985 | Till et al. | |
| 4,827,967 | A | 5/1989 | Junier | |
| 4,872,467 | A | 10/1989 | Ballu | |
| 5,333,638 | A * | 8/1994 | Maxwell | F16K 17/0473 137/115.04 |
| 5,540,253 | A | 7/1996 | Junier | |
| 5,640,643 | A * | 6/1997 | Hoitz | B08B 9/0813 134/104.2 |
| 5,791,557 | A * | 8/1998 | Kunze | G05D 23/1333 236/34.5 |
| RE36,121 | E | 3/1999 | Junier | |
| 5,984,148 | A | 11/1999 | Andel et al. | |
| 6,053,196 | A * | 4/2000 | Kortge | F04B 49/225 137/115.28 |
| 6,142,389 | A * | 11/2000 | Kynett | E03C 1/08 239/444 |
| 6,283,146 | B1 * | 9/2001 | Okitsu | G05D 16/10 137/505.26 |
| 6,357,467 | B1 * | 3/2002 | Ringer | A62C 35/68 137/119.01 |
| 6,857,444 | B2 * | 2/2005 | Davis | B08B 3/026 137/115.06 |
| 7,318,555 | B1 | 1/2008 | Ueda et al. | |
| 7,644,870 | B2 | 1/2010 | Alexander et al. | |
| 8,182,759 | B2 | 5/2012 | Kuroshima | |
| 8,298,494 | B2 * | 10/2012 | Komiya | A61B 1/123 422/292 |
| 9,027,582 | B2 | 5/2015 | Johnson | |
| 9,121,516 | B2 | 9/2015 | Sauer | |
| 9,435,444 | B2 * | 9/2016 | Ruh | F16K 11/02 |
| 9,629,519 | B2 * | 4/2017 | Takazawa | A61B 1/00128 |
| 2003/0106588 | A1 * | 6/2003 | Zahe | G05D 16/106 137/491 |
| 2004/0099313 | A1 * | 5/2004 | Gotthelf | G05D 16/107 137/505.39 |
| 2006/0201554 | A1 * | 9/2006 | Prinsen | F16K 17/0433 137/491 |
| 2006/0269442 | A1 * | 11/2006 | Nguyen | F16L 33/16 422/28 |
| 2009/0205687 | A1 * | 8/2009 | Onishi | B08B 9/032 134/136 |
| 2010/0004510 | A1 * | 1/2010 | Kuroshima | A61B 1/123 600/158 |
| 2010/0175763 | A1 * | 7/2010 | Newman | F41B 11/723 137/505.42 |
| 2010/0243073 | A1 | 9/2010 | Tolle et al. | |
| 2012/0056114 | A1 * | 3/2012 | Bennauer | F16K 31/56 251/25 |
| 2013/0008715 | A1 * | 1/2013 | Arteaga | E21B 33/06 175/5 |
| 2013/0214190 | A1 * | 8/2013 | Semones | F16K 27/0263 251/324 |
| 2015/0166321 | A1 | 6/2015 | Oeser et al. | |
| 2017/0059054 | A1 * | 3/2017 | Gao | F16K 11/07 |

OTHER PUBLICATIONS

ARAG G-Assorted Items Catalogue, Container and Tank Rinsing Jets, 510101/510111, G-20 (Jan. 4, 2019, Version M01) (available at http://www.aragnet.com/VediMacro/EN/vediMacro.phtml?IDMacro=298).

ARAG Push Valve (P/N: 510100), Depiction and Photo.

POLMAC Push Valve, P/Ns 6341169V, 6M41169V, 634116SV, 6M4116SV, 6341219V, 6M41219V, 634121SV, 6M4121SV, 6341259V, 6M41259V, 63433499, and 63411699, https://polmac.it/catalogo/it/polmac-accessori-di-travaso-e-lavaggio?p=2 (last accessed Jul. 2, 2019).

POLMAC Nozzle (P/N 6M41169V), Excerpt.

* cited by examiner

PUSH VALVE ASSEMBLY AND METHOD

BACKGROUND

Various precautions are taken to ensure that chemical containers are properly washed after the contents have been removed from the container. A hose or nozzle can be used to deliver pressurized water into the otherwise empty container, which contacts the interior surfaces of the container to remove residual chemical material present within the container. In some examples, the container is inverted relative to the water source so that pressurized rinse water can enter upward into the container cavity, contact the interior surfaces of the cavity to remove residual chemicals, and naturally drain out of the container through its opening. The container washing process can continue until all surfaces of the cavity have been properly rinsed of chemical contaminants.

SUMMARY

Some embodiments of the invention provide a push valve assembly for washing containers, such as chemical bottles. The push valve assembly can be incorporated into chemical mixing and cleaning stations, for example, and can be configured to selectively provide a rinsing fluid (e.g., water) to a nozzle that dispenses the rinsing fluid to wash out the interior of container. The push valve assembly includes a valve piston that is movable within a valve body between a fully opened and a fully closed position to selectively provide pressurized fluid through the valve body into the nozzle. The valve piston can define a primary flow path through the piston and a secondary flow path around the piston to both transport rinse water to the nozzle and, when in an intermediate position, to flush the valve body of contaminant buildup that may occur within the push valve assembly.

In other embodiments, a push valve assembly is configured to direct a fluid through the push valve assembly. The push valve assembly comprises a body defining a fluid inlet and a fluid outlet downstream of the fluid inlet, a piston that is moveable within the body, a primary flow path defined through the piston, and a secondary flow path defined between the body and the piston. A position of the piston relative to the body defines: a closed position in which the piston inhibits the fluid from passing from the fluid inlet along both the primary flow path and the secondary flow path to the fluid outlet; a transitional position in which the piston permits the fluid to pass from the inlet along both the primary flow path and the secondary flow path; and an opened position in which the piston permits the fluid to pass along the primary flow path from the inlet to the outlet and inhibits the fluid from passing along the secondary flow path.

In further embodiments, a push valve assembly comprises a valve body having a wall defining an inlet end, an outlet end, and a bore extending therebetween. An inlet having a wall defining a passage is aligned with the bore, and the inlet is coupled to the inlet end of the valve body. A piston is movably received within the valve body and the inlet, and is configured to selectively restrict fluid communication between the passage and the bore by engaging the inlet. The piston is movable between a first position where the bore and the passage are not in fluid communication, a second position where the bore and the passage are in fluid communication, and a third position where the bore and the passage are not in fluid communication and the passage and a piston interior are in fluid communication.

In still other embodiments, a push valve assembly comprises a body extending from an inlet end to an outlet end, the body defining a bore between the inlet end and the outlet end. An inlet is proximate the inlet end of the body and extends from an intake end to a discharge end, the inlet defines a passage between the intake end and the discharge end. A piston is moveable within the bore and the passage, and the piston defines an interior between an opening and an outlet. A recess is defined between the body and the piston. A primary flow path is defined through the passage of the inlet and the interior of the piston. A secondary flow path is defined between the passage of the inlet and the recess between the body and the piston. A position of the piston relative to the inlet defines: a closed position in which the piston inhibits respective fluid communication through both the primary flow path and the secondary flow path; a transitional position in which the piston permits respective fluid communication through both the primary flow path and the secondary flow path; and an opened position in which the piston permits fluid communication through the primary flow path and inhibits fluid communication through the secondary flow path.

These and other features of the present disclosure will become more apparent from the following description of the illustrative embodiments.

Corresponding reference characters indicate corresponding parts throughout the several views. Although the drawings represent embodiments of the present disclosure, the drawings are not necessarily to scale and certain features may be exaggerated in order to better illustrate and explain the embodiments of the present disclosure.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1:
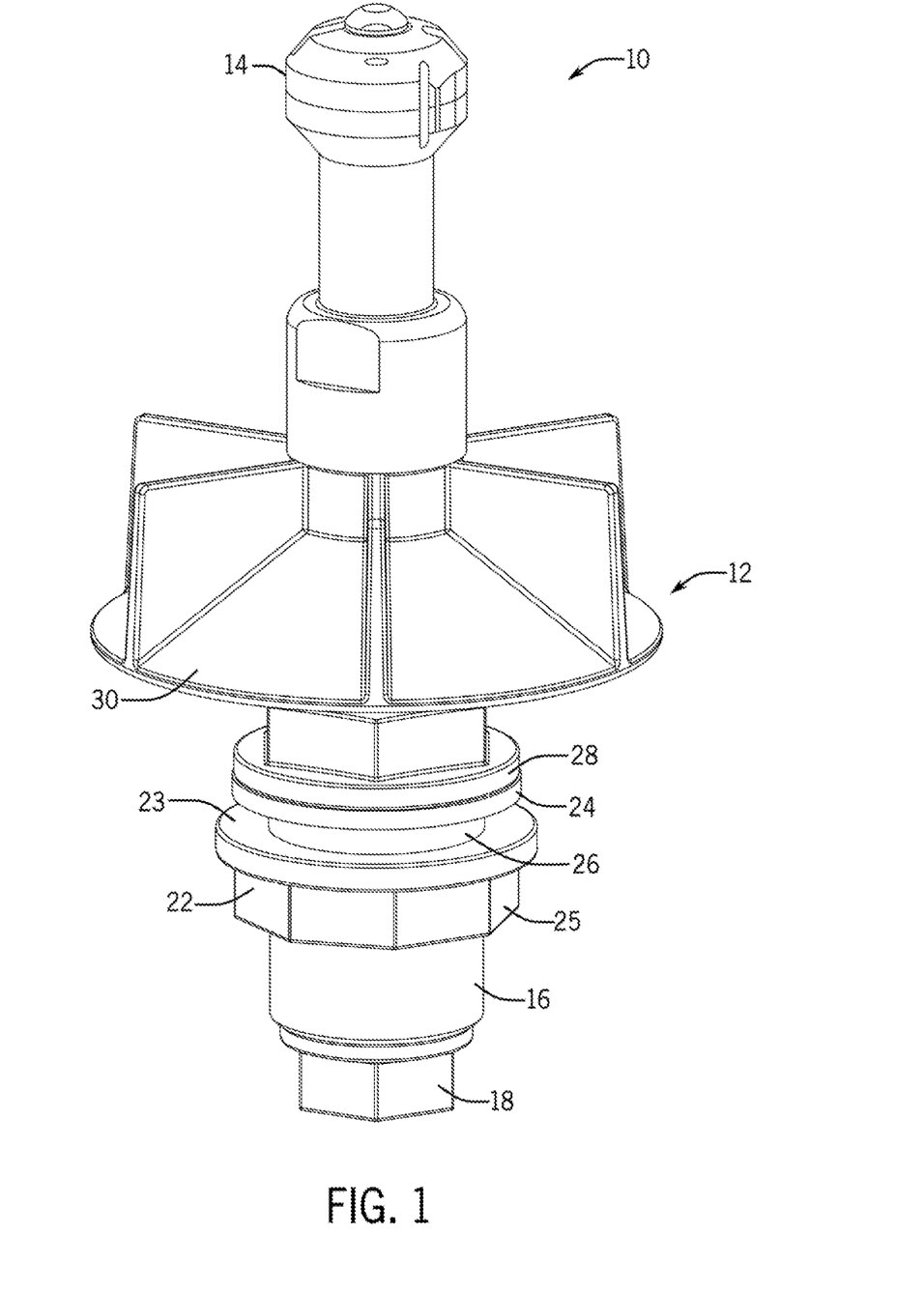
FIG. 1 is a perspective view of a container rinse assembly according to one embodiment of the invention.

FIG. 1 illustrates a container rinse assembly 10 according to one embodiment of the invention. The rinse assembly 10 can include a push valve assembly 12 and a rinse nozzle 14 coupled to and in fluid communication with the push valve assembly 12, for example. The push valve assembly 12 can be placed in fluid communication with a pressurized fluid source, such as a water tank or water well (not shown), and can be movable between at least two different positions to selectively control fluid communication between the pressurized fluid source and the rinse nozzle 14. When placed in fluid communication with the pressurized fluid source, the rinse nozzle 14 can dispense pressurized rinse fluid both radially and axially away (e.g., upward and outward) from the push valve assembly 12, where the fluid can then contact and clean the interior surfaces of chemical bottles or containers placed over the rinse nozzle 14. The rinse nozzle 14 can be a stationary or rotatable nozzle, and can be seated atop and removably coupled to the push valve assembly 12. In some embodiments, the rinse nozzle 14 could be chosen from the group of Hypro ProClean™ rinsing nozzles produced and sold by Pentair Hypro Shurflo. In some embodiments, the rinse assembly 10 is placed within a wash basin (not shown), which can include a drain to dispose of any liquid or other contaminants that are removed from chemical containers and the like during the rinsing processes, such as the rinsing process described in detail below.

Figure 2:
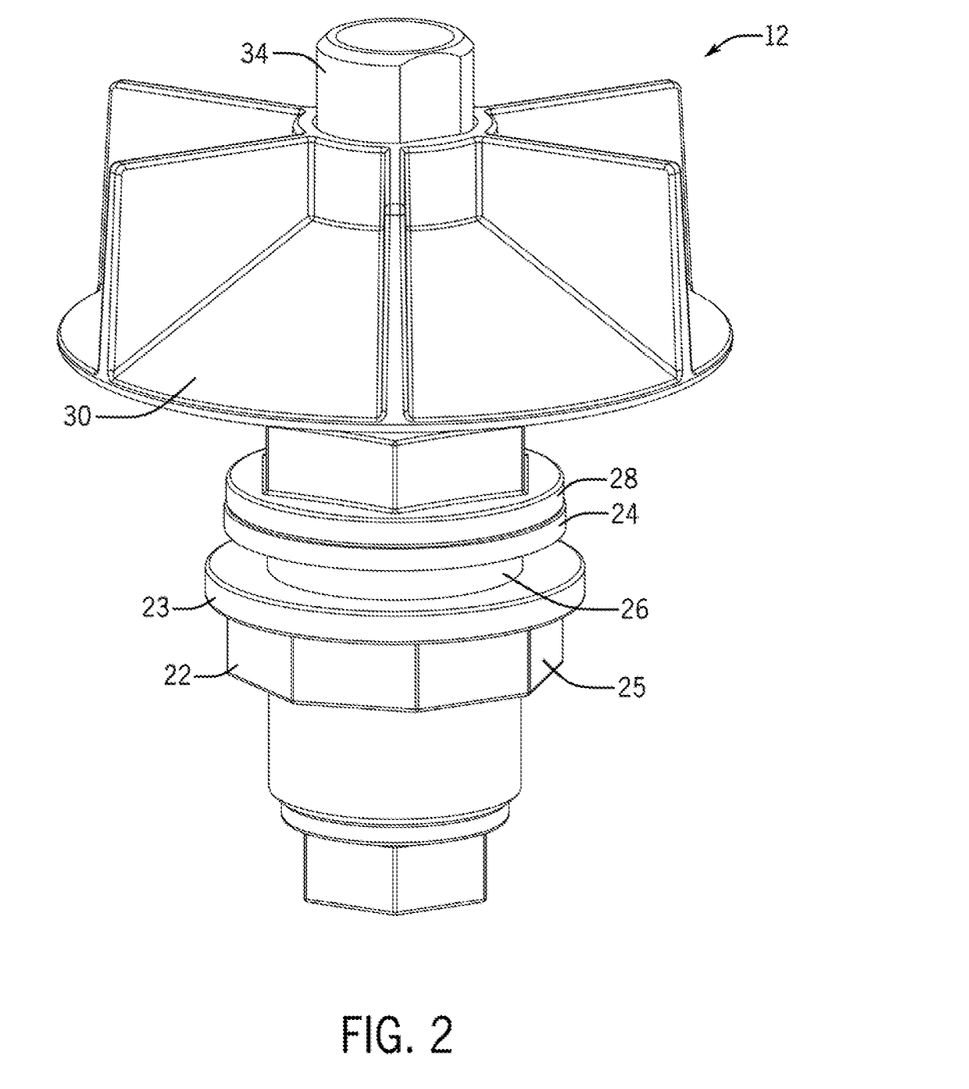
FIG. 2 is a perspective view of a push valve assembly present in the rinse assembly of FIG. 1.
Figure 3:
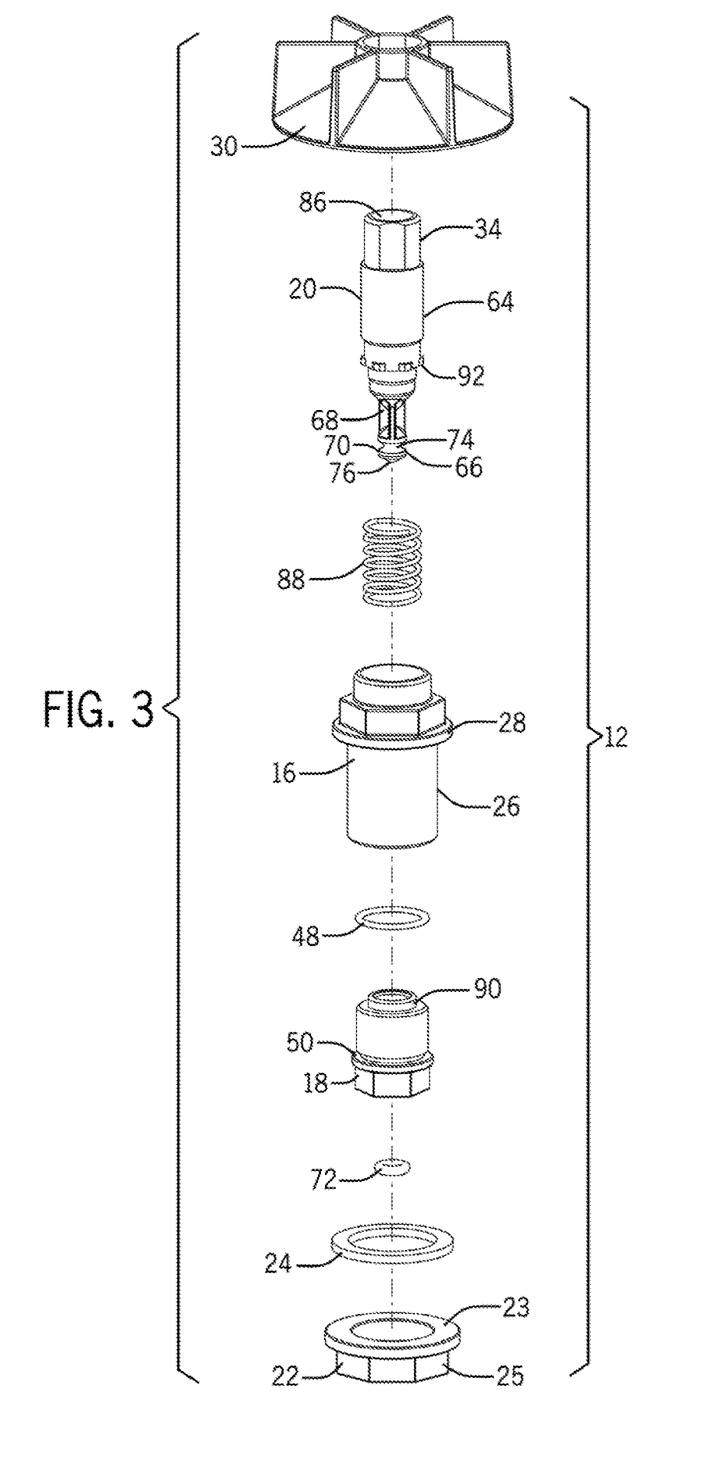
FIG. 3 is an exploded view of the push valve assembly of FIG. 2.

With additional reference to FIGS. 2 and 3, the push valve assembly 12 is shown in isolation from the rinse nozzle 14. The push valve assembly 12 generally includes a valve body 16, an inlet 18, and a piston 20 movable within the valve body 16 to define a fluid flow path through the push valve assembly 12. The various components of the push valve assembly 12 can be integral or separate; for example, the valve body 16 and the inlet 18, which are illustrated as separable components, may be integral thus defining a single fluid inlet and a single fluid outlet at upstream and downstream ends, respectively. A ring 22 can be compressively or threadably fit around a portion of the valve body 16. The ring 22 can be in the form of a flange nut, which includes a mounting flange 23 and a generally polygonal (e.g., hexagonal or octagonal) grasping section 25. In some embodiments, a gasket 24 is received around a stem 26 of the valve body 16 and can abut a shoulder 28 of the valve body 16 that extends outwardly from the stem 26. The gasket 24 can be used to form a seal between the valve body 16 and a surrounding wash basin (not shown) to which the push valve assembly 12 may be mounted. A collar 30 can be coupled to the piston 20 to direct rinse water exiting a chemical container (not shown) outwardly away from the entire push valve assembly 12, as explained in detail below. The inlet 18 can include female threads 32 to threadably receive and couple with a pressurized fluid source, while the piston 20 can include male threads 34 to threadably engage and couple with the rinse nozzle 14. In some examples, the threads 32, 34 may be ½" NPT threads, G ½" threads, and the like.

Figure 4A:
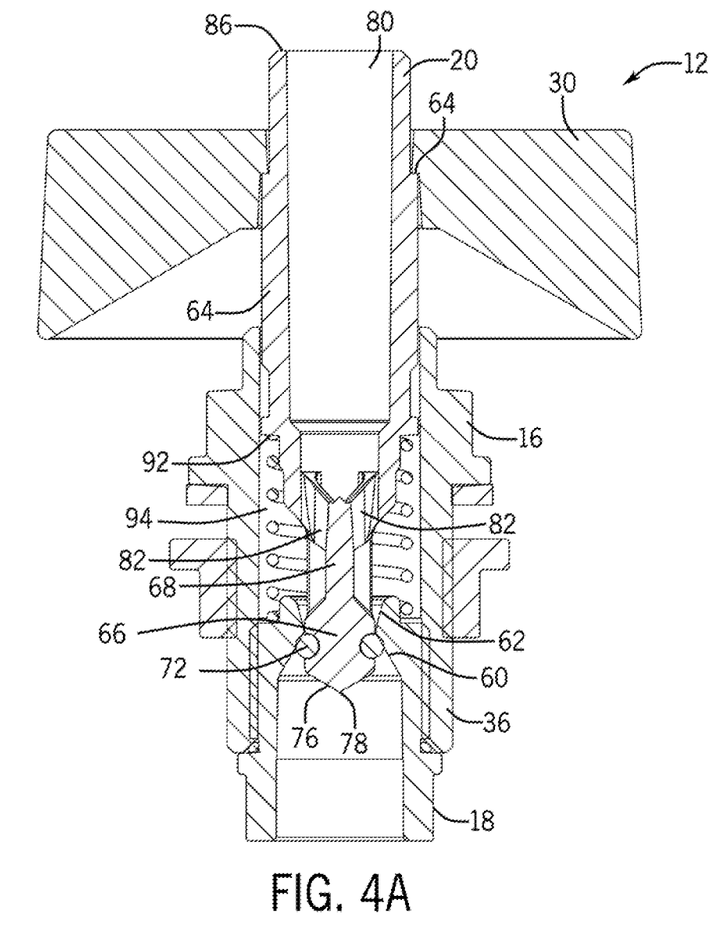
FIG. 4A is a cross-sectional view of the push valve assembly of FIG. 2 in a fully closed position.
Figure 4B:
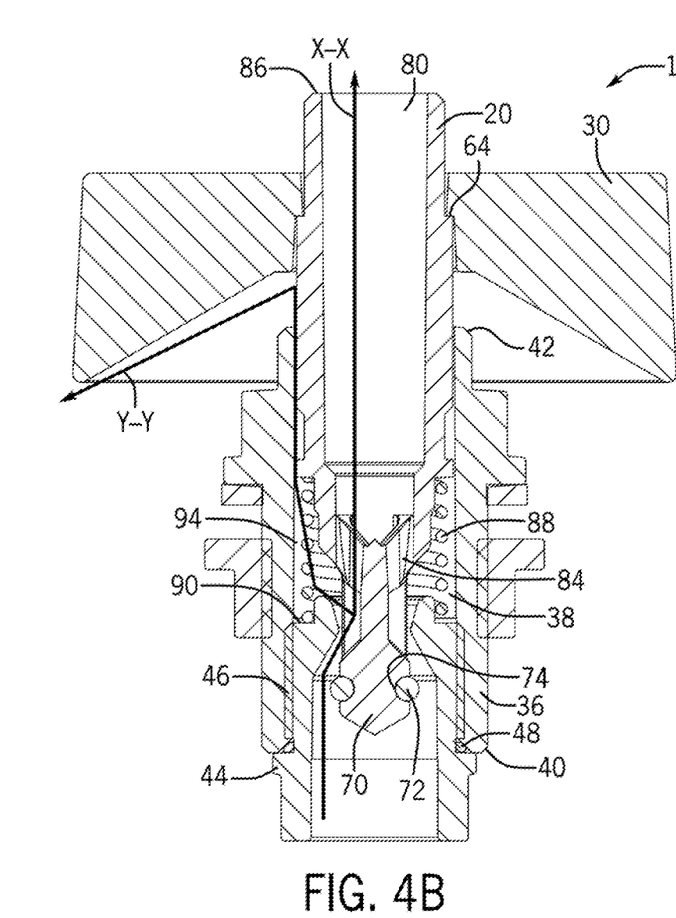
FIG. 4B is a cross-sectional view of the push valve assembly of FIG. 2 in an intermediate, transitional position.
Figure 4C:
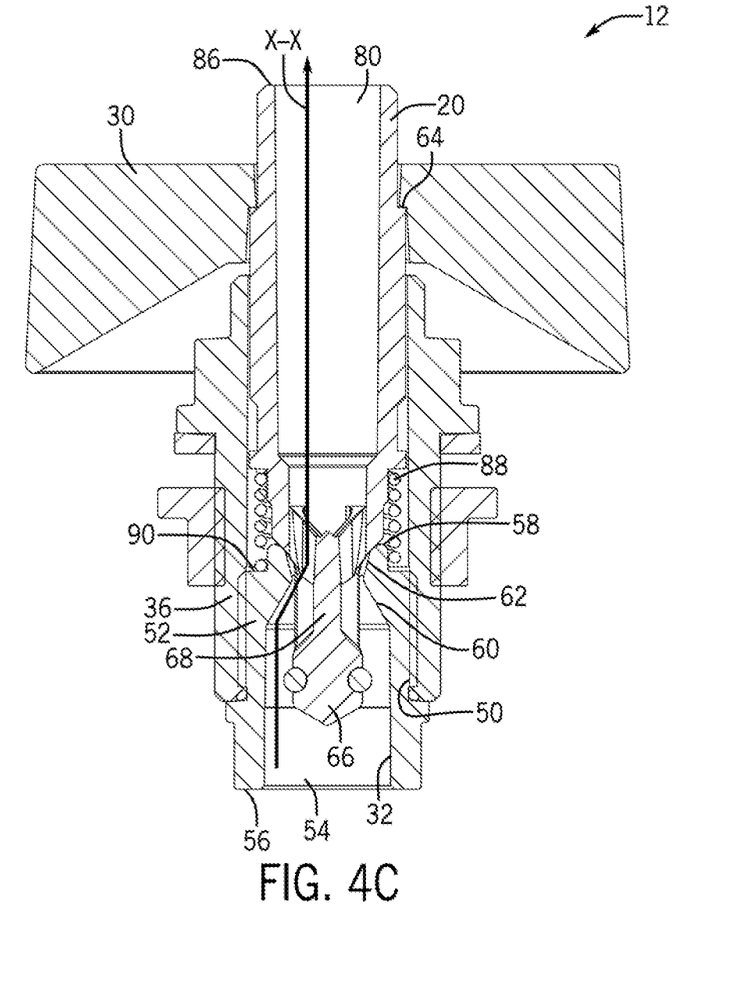
FIG. 4C is a cross-sectional view of the push valve assembly of FIG. 2 in a fully opened position.

FIGS. 4A-4C illustrate the internal components and operation of the push valve assembly 12. As explained above, the valve body 16, inlet 18, and piston 20 together define multiple flow paths through the push valve assembly 12. The valve body 16 has a generally cylindrical wall 36 that defines a central bore 38 extending axially through the valve body 16 from an inlet end 40 to an outlet end 42 opposite the inlet end 40. In some embodiments, the inlet 18 is received within the inlet end 40 of the valve body 16. The inlet 18 can be press fit or threadably rotated into position within the central bore 38 of the valve body 16 until the inlet end 40 of the valve body 16 abuts an inlet shoulder 44 extending radially outward from a generally cylindrical inlet stem 46. In some embodiments, a sealing element 48 (e.g., an O-ring) is received around the inlet stem 46 and positioned between the inlet shoulder 44 and the valve body 16 to form a seal between the inlet 18 and valve body 16. Optionally, a groove 50 can be formed in the inlet stem 46 to help position the sealing element 48 upon the inlet 18.

The inlet 18 can be a continuous component with a generally cylindrical wall 52 defining a central passage 54 formed through the inlet 18 between an intake end 56 and a discharge end 58. In some examples, the intake end 56 is generally cylindrical and has a constant cross-section, while the discharge end 58 is tiered to include a nozzle section 60 and a diffuser section 62. In the nozzle section 60, an inner surface of the wall 52 can taper radially inward as it extends toward the discharge end 58, which reduces the cross-sectional area in the central passage 54 that fluid can pass through. The diffuser section 62 extends away from the nozzle section 60, and the wall 52 tapers radially outward as it extends toward the discharge end 58, widening the central passage 54.

The piston 20 extends axially into the central bore 38 of the valve body 16 and into the central passage 54 of the inlet 18 to influence fluid flow therethrough. The piston 20 has a generally cylindrical piston body 64 with a piston head 66 formed at one end of the piston 20, opposite the male threads 34. The piston head 66 can have an elongated section 68 extending away from the piston body 64 to a plugging section 70. The plugging section 70 extends radially outward from the elongated section 68 and is configured to selectively engage the nozzle section 60 of the inlet 18. A sealing element 72, such as an O-ring, can be coupled to the plugging section 70 and can be configured to form a fluidic seal between the inlet 18 and the plugging section 70 of the piston 20 when the valve assembly 12 is in a closed position, as shown in FIG. 4A. A groove 74 can be formed in the piston head 66 to accommodate and secure the sealing element 72 to the piston 20. In some embodiments, the leading end 76 of the piston head 66 has a conic shape that tapers radially outward as it extends away from an apex 78 formed at the leading end 76. As explained below, the conic shape of the leading end 76 can help further shape fluid flow through the inlet 18 and limit head loss due to friction during push valve assembly 12 operation.

The interior 80 of the piston body 64 can be hollow to define a primary fluid flow path X-X therethrough. In some embodiments, a plurality of openings 82 are formed through the piston body 64 adjacent the elongated section 68 of the piston head 66 to allow fluid access into the generally cylindrical interior 80 of the piston body 64 from an external environment (e.g., the inlet 18 or the valve body 16). The openings 82 can be separated by fins 84 spaced about the piston 20. The fins 84 can taper radially outward and axially away from the elongated section 68 of the piston head 66 toward the piston body 64, and can be used to shape fluid flow as fluid enters into the hollow interior 80 of the piston body 64 to an outlet 86 during push valve assembly 12 operation.

The piston 20 can be biased outward from the valve body 16 toward a closed position (see FIG. 4A) by a biasing element 88 such as, for example, a compression spring. As illustrated in FIGS. 4A-4C, the biasing element 88 can be received around the discharge end 58 of the inlet 18, abutting a mounting surface 90 axially offset from the discharge end 58 of the inlet 18. The biasing element 88 can be adhesively or compressively coupled to the inlet 18, for example. The biasing element 88 supports and controls the position of the piston 20 relative to the inlet 18 and the valve body 16. In some examples, a portion of the piston body 64 and the piston head 66 can extend into and/or through the biasing element 88. The biasing element 88 can abut a piston shoulder 92, which provides a supporting surface on the exterior of the piston body 64. The biasing element 88 and fluid engaging surfaces of the inlet 18, valve body 16, and piston 20 can be configured to establish a desired response to the application of a static or dynamic fluid pressure at inlet 18.

With reference specifically to FIG. 4A, the push valve assembly 12 is shown in a closed position. The piston 20 is biased upward by the biasing element 88 so that the sealing element 72 and the plugging section 70 of the piston head 66 engage the nozzle section 60 of the inlet 18. Fluid (e.g., rinse water) contained within the central passage 54 of the inlet 18 is restricted from passing from the inlet 18 into the valve body 16 (and into the piston body interior 80, outward to a rinse nozzle 14, for example) by the seal formed between the sealing element 72, the piston head 66, and the inlet 18.

The push valve assembly 12 can be actuated, as shown in FIG. 4B, by depressing the collar 30. The collar 30 can be depressed axially in a number of ways, including by hand and by a chemical bottle positioned on top of the collar 30 and received around a portion of the piston 20, for example. Because the collar 30 is coupled to the piston body 64, axial force imparted on the collar 30 is translated to the piston body 64, which then moves axially relative to the valve body 16 and the inlet 18, against the force of the biasing element 88. The biasing element 88 deflects as the collar 30 is depressed, which causes the plugging section 70 of the piston head 66 to disengage with the nozzle section 60 of the inlet 18. With the piston head 66 disengaged from the inlet 18, fluid communication is created between the inlet 18, the valve body 16, and the interior 80 of the piston.

When the push valve assembly 12 is in an intermediate, transitional position, such as partially opened/closed shown in FIG. 4B, multiple fluid flow paths are defined through the push valve assembly 12. A primary flow path X-X is created between the inlet 18, the valve body 16, and the interior 80 of the piston body 64. Pressurized fluid passes into the inlet 18, where it can be shaped by the conic section of the leading end 76 of the piston head 66. The fluid can then pass into the nozzle section 60 of the inlet 18, where it increases in velocity as it enters the diffuser section 62. The fluid then flows upward, through the openings 82 in the piston body 64 where the flow is shaped by the fins 84 spaced about the piston head 66 and enters into the interior of the piston body 64 and exits out of the outlet 86 formed at the end of the piston 20, where it can enter into a rinse nozzle 14, for example.

The secondary flow path Y-Y created while in the transitional positions (i.e., between the opened and closed positions) can promote longer push valve assembly 12 life by flushing the assembly 12 of any particulate buildup or residual chemical that may occur during rinsing processes. Like the primary flow path X-X, pressurized fluid (e.g., rinse water) initially enters into the inlet 18, where it can be shaped by the conic section of the leading end 76 of the piston head 66. The fluid can then pass into the nozzle section 60 of the inlet 18, where it increases in velocity as it enters the diffuser section 62. As it exits the diffuser section 62 of the inlet 18, a low pressure zone formed in the recess 94 between the valve body 16 and the piston 20 urges fluid radially outward, where it can then contact the generally cylindrical wall 36 of the valve body 16. The fluid continues to travel upward/downstream, between the valve body 16 and the piston body 64 until it exits the valve body 16. In some embodiments, the pressurized fluid is directed downwardly and radially outward from the push valve assembly 12 by the underside of the collar 30, which is angled. The flushing process performed by the push valve assembly 12 can extend the life of the push valve assembly 12, as chemical and particulate material is dispersed that may otherwise build up causing the valve assembly 12 to jam, degrade, or otherwise fail over time.

The collar 30 and piston 20 can be axially translated until the piston body 64 engages the discharge end 58 of the inlet 18, as shown in FIG. 4C. In this orientation, the push valve assembly 12 is in its fully opened position. The secondary flow path Y-Y is blocked off by the seal created by engagement between the piston body 64 and the inlet 18, and the pressurized fluid passing beyond the inlet 18 is directed through the openings 82, shaped by the fins 84, and passed into the interior 80 of the piston body 64 toward the outlet 86 (and a rinse nozzle 14, optionally).

Once the desired amount of fluid has been transferred through the push valve assembly 12, the collar 30 can be released. Once the axial force on the collar 30 (and therefore, the piston 20) is removed, the biasing element 88 urges the push valve assembly 12 back to the closed position shown in FIG. 4A. However, when the axial force on the collar 30 and piston 20 is initially released, the valve assembly 12 once again performs the flushing process described in FIG. 4B, as the piston body 64 disengages the inlet 18 and restores the secondary fluid flow path Y-Y. With the illustrated design, the push valve assembly 12 automatically performs the flushing process when the push valve assembly 12 is transitioned between opened and closed positions, which can flush the valve body 16 without requiring any additional time or dedicated processes, saving both time and money by prolonging valve assembly 12 life.

The rinse assembly 10 can perform a container rinsing process. Initially, an empty container (not shown) can be positioned about the rinse nozzle 14 and adjacent to the collar 30. In some embodiments, the rinse nozzle 14 is received within the container, which can be upside down (i.e., opening facing downward) relative to the rinse assembly 10. The container can be pressed downward, which forces the collar 30 and piston 20 downward, opening up the push valve assembly 12. While the push valve assembly 12 is being opened, rinse water can flow from a pressurized fluid source (e.g., water at 5-300 psi) upward, into the inlet 18, and through both of the primary flow path X-X and the secondary flow path Y-Y. The container is pushed downward until the push valve assembly 12 is in its fully opened position (see FIG. 4C), where pressurized water is provided upward into the nozzle 14 and into the container at flow rates between about 1 and about 50 gallons per minute. The water enters into the container at a high velocity and can contact the interior surfaces of the container, removing residual matter left within the container. Assisted by gravity, the water flows downward, out of the container and onto the collar 30, which directs the water away from the rinse assembly 10, to a drain, for example. Once an appropriate rinsing cycle has been performed, the chemical container can be lifted, which allows the biasing element 88 to push the piston 20 and collar 30 back upward to close the push valve assembly 12. While the push valve assembly 12 is transitioning from fully opened to fully closed, the flushing cycle can once again occur, as the secondary fluid flow path Y-Y is temporarily restored during the transition process. Accordingly, the push valve assembly 12 is flushed before and after every use.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A push valve assembly comprising:
a valve body having a wall defining an inlet end, an outlet end, and a bore extending therebetween;
an inlet having a wall defining a passage aligned with the bore, the inlet coupled to the inlet end of the valve body; and
a piston movably received within the valve body and the inlet, and configured to selectively restrict fluid communication between the passage and the bore by engaging the inlet, the piston movable between a first position where the bore and the passage are not in fluid communication, a second position where the bore and the passage are in fluid communication, and a third position where the bore and the passage are not in fluid communication and the passage and a piston interior are in fluid communication.

2. The push valve assembly of claim 1, wherein when the piston is in the second position, a secondary flow path establishes fluid communication between the passage of the inlet and a recess between the piston and the valve body.

3. The push valve assembly of claim 1, wherein the inlet is threadably coupled to the inlet end of the valve body.

4. The push valve assembly of claim 1, wherein:
the inlet defines a nozzle section;
the piston defines a head; and
the nozzle section and the head are configured to engage when the piston is in the first position.

5. A push valve assembly comprising:
a body extending from an inlet end to an outlet end, the body defining a bore between the inlet end and the outlet end;
an inlet proximate the inlet end of the body and extending from an intake end to a discharge end, the inlet defining a passage between the intake end and the discharge end;
a piston moveable within the bore and the passage, the piston defining an interior between an opening and an outlet;
a recess defined between the body and the piston;
a primary flow path defined through the passage of the inlet and the interior of the piston; and
a secondary flow path defined between the passage of the inlet and the recess between the body and the piston;
wherein a position of the piston relative to the inlet defines:
a closed position in which the piston inhibits respective fluid communication through both the primary flow path and the secondary flow path;
a transitional position in which the piston permits respective fluid communication through both the primary flow path and the secondary flow path; and
an opened position in which the piston permits fluid communication through the primary flow path and inhibits fluid communication through the secondary flow path.

6. The push valve assembly of claim 5, wherein the body and the inlet are threadably engaged.

7. The push valve assembly of claim 5, wherein the recess is defined between an interior cylindrical surface of the bore and an exterior cylindrical surface of the piston.

8. The push valve assembly of claim 5 wherein:
the piston defines a piston body and a piston head connected to the piston body via an elongated section;
the opening is formed through the elongated section; and
the interior and the outlet are formed in the piston body.

9. The push valve assembly of claim 5, wherein the inlet further comprises:
a nozzle section proximate the intake end; and
a diffuser section proximate the discharge end.

10. The push valve assembly of claim 9, wherein the piston defines a piston head with a plugging section configured to selectively engage the nozzle section when then piston is in the closed position.

11. The push valve assembly of claim 5, wherein the piston further defines an elongated section configured to selectively engage the discharge end when the piston is in the opened position to inhibit fluid communication between the passage and the recess.

12. The push valve assembly of claim 5, further comprising a collar coupled to the piston, wherein the recess terminates proximate the outlet end of the body such that when the piston is in the transitional position fluid exiting the recess through the secondary flow path is directed toward the collar.

13. The push valve assembly of claim 5, further comprising a biasing member positioned between the inlet and the piston to urge the piston toward the closed position.

* * * * *